J. DEVLIN.
Lever Escapement.
No. 29,575. 
Patented Aug. 14, 1860.
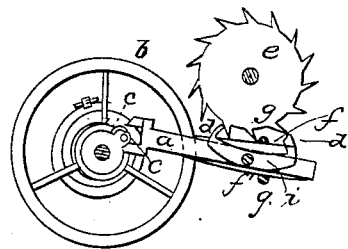
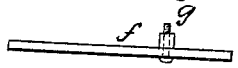

UNITED STATES PATENT OFFICE.

JOHN DEVLIN, OF PHILADELPHIA, PENNSYLVANIA.

LEVER-ESCAPEMENT FOR WATCHES.

Specification of Letters Patent No. 29,575, dated August 14, 1860.

*To all whom it may concern:*

Be it known that I, JOHN DEVLIN, of the city and county of Philadelphia and State of Pennsylvania, have invented a new and useful Improvement in the Lever-Escapement of Watches and other Timekeepers; and I do hereby declare that the following is a full, clear, and exact description of the same, reference being had to the accompanying drawings, forming part of this specification, in which—

Figure 1, is a plan of a lever escapement with my improvement applied. Fig. 2, is a view of the lever and the springs which constitute my invention on an enlarged scale. Fig. 3, is a side view of one of the springs detached.

Similar letters of reference indicate corresponding parts in the several figures.

$a$, is the lever which is represented as acting upon the balance $b$, through a double roller $c$, $c$, but which may act through a single roller in the common way.

$d$, $d$, are the pallets and $e$, the escapement wheel.

$f$, $f'$, are the banking springs which form the subject of my invention, being made of very light slightly curved strips of steel in the form of levers of the first order, with long and short arms, their fulcra consisting of two stationary pivots $g$, $g$, which occupy a position nearly corresponding with that of the common banking pins but preferably arranged rather nearer to the staff $i$, of the lever $a$, than it is usual to place the banking pins. The shorter arms of the springs lie side by side with the short arm of the lever $a$, and the longer arms extend the greater part of the distance along the sides of the long or forked arm of the same.

The action of the lever and springs is as follows. Immediately after the lever has commenced moving from one extreme of its vibration toward the other, the shorter arm of the same strikes the shorter arm of the spring away from which the forked or longer arm of the lever is moving. The stroke thus given to the spring by the shorter arm of the lever, owing to the relative positions of their fulcra, causes the longer arm of the said spring to move faster than the longer or forked arm of the lever, thus overtaking it and by impact, transmitting thereto nearly that amount of increase in its force which would have been lost by its shorter arm striking against a banking pin as heretofore. As the lever nears the pivot of the said spring (both ends of which latter being now in contact with the lever) it (the spring) thereby becomes slightly stiffened, and thus serves the office of a banking pin, but without the rigidity of the latter, and finally causes the lever to stop without a shock or jar. There is now a certain degree of power stored up in the spring and exerted against the lever in a direction opposite to the pivot of the spring, not sufficiently strong however to unlock the pallet from the escape wheel, but on the return-motion of the balance, the lever becomes thereby unlocked from the said escape wheel, and the spring, in then assuming its original curve, necessarily bears for a moment with a slight degree more of force upon the shorter arm of the lever than it does upon the longer one and, by so much, aids the lever's immediately subsequent vibration toward the opposite side of its stroke; but this latter effect of the spring is only incidental—the chief and only important impulse given to the balance by the action of the spring upon the lever, occurs precisely at the time when the cog of the escape wheel is passing against the face of the pallet; immediately after which, the spring acts as a banking spring in retarding the motion of the lever until it is stopped.

The above described action of the springs is illustrated by Fig. 1, and also by Fig. 3. In the former figure the shorter arm of the lever is shown acting upon the shorter arm of the spring $f'$, and the longer arm of the spring ($f'$) to be overtaking and transmitting, by impact, additional force to the longer, or forked arm of the lever, the spring $f$, being passive; and in the latter figure, the spring $f$, is shown as being in action, and the spring $f'$, passive.

It will be perceived that it is the spring, away from which the forked end of the lever is moving, is the one which gives the additional impulse to the balance, and precisely at the time when the said lever is crossing its center of oscillation—the opposite spring, in the meantime, being entirely passive; and that the power expended upon the lever by the main spring of the watch, acting through the escape wheel and pallets, is economized by the substitution of the banking springs ($f$, $f'$,) for the usual banking pins, and made to act with more force and uniformity upon the balance, giving the whole a lively, easy, and regular motion. Another important advantage derived from the application of these springs is shown in practice, by the continuance of the movement immediately on ceasing to wind the watch, when the latter is destitute of a "going fusee" to serve in maintaining the power during the operation. This continuance is caused by the springs ($f$ and $f'$,) partly by their effecting a diminished liability of the pallets to be caught fixedly upon the cogs of the escape wheel during the winding; and partly by the falling of the longer arm of either the one or the other (as the case may be) of the said springs against the forked end of the lever, in connection with the counterpoising action of the other spring against the shorter arm of the lever, and thus together starting it, on the slightest turning of the watch, as, for instance, in closing the case. It is not however to be understood that these freely moving springs will, of themselves, keep the watch going while the main spring is being held suspended by the key in winding; but that on ceasing to wind the watch, it can scarcely be moved in any direction, and certainly can not be put into one's pocket, without being set agoing; and therefore a "going fusee" is not required to prevent such a watch from being permanently stopped by the periodical counter action of winding.

I am aware that straight springs have been fixed to the "plate" in a stationary manner, not to aid, nor to control the motion of the lever in its legitimate action, but so as to serve only as a yielding stop on each side of the longer or forked end of the lever, for the purpose of "preventing either the ruby pin or the pivots, from being broken in case of a sudden twist of the watch, or any other cause that might set the balance swinging over two rounds"—as described in the specification of Thomas Robjohn; therefore I do not claim such springs, but

What I claim as my invention and desire to secure by Letters Patent is—

The application to the lever of the banking springs $f$, $f'$, constructed and arranged to operate in the peculiar manner herein described.

JOHN DEVLIN.

Witnesses:
  NATHAN BARRETT,
  GEORGE ERCTY.